United States Patent
Salvador Marcos et al.

(10) Patent No.: US 9,965,832 B2
(45) Date of Patent: May 8, 2018

(54) METHOD FOR PERFORMING SUPER-RESOLUTION ON SINGLE IMAGES AND APPARATUS FOR PERFORMING SUPER-RESOLUTION ON SINGLE IMAGES

(71) Applicant: THOMSON LICENSING, Issy les Moulineaux (FR)

(72) Inventors: Jordi Salvador Marcos, Hamburg (DE); Eduardo Perez Pellitero, Hannover (DE); Axel Kochale, Springe (DE)

(73) Assignee: THOMSON LICENSING, Issy les Moulineaux (FR)

( * ) Notice: Subject to any disclaimer, the term of this patent is extended or adjusted under 35 U.S.C. 154(b) by 84 days.

(21) Appl. No.: 15/118,468

(22) PCT Filed: Feb. 13, 2015

(86) PCT No.: PCT/EP2015/053111
§ 371 (c)(1),
(2) Date: Aug. 11, 2016

(87) PCT Pub. No.: WO2015/121422
PCT Pub. Date: Aug. 20, 2015

(65) Prior Publication Data
US 2017/0178293 A1    Jun. 22, 2017

(30) Foreign Application Priority Data

Feb. 13, 2014 (EP) ..................................... 14305189
Jun. 26, 2014 (EP) ..................................... 14174107

(51) Int. Cl.
*G06T 3/40* (2006.01)
*G06T 7/00* (2017.01)
*G06K 9/62* (2006.01)
*G06K 9/52* (2006.01)
*G06K 9/46* (2006.01)

(52) U.S. Cl.
CPC .............. *G06T 3/4053* (2013.01); *G06K 9/52* (2013.01); *G06K 9/6215* (2013.01); *G06T 7/0002* (2013.01); *G06K 2009/4666* (2013.01)

(58) Field of Classification Search
CPC ....... G06T 3/4053; G06T 7/0002; G06K 9/52; G06K 9/6215; G06K 2009/4666
See application file for complete search history.

(56) References Cited

U.S. PATENT DOCUMENTS

2013/0034299 A1    2/2013    Lin et al.

OTHER PUBLICATIONS

Farsiu et al., "Fast and Robust Multiframe Super Resolution", IEEE Transactions on Image Processing, vol. 13, No. 10, Oct. 2004, pp. 1327-1344.

Freedman et al., "Image and Video Upscaling from Local Self-Examples", ACM Transactions on Graphics, vol. 30, No. 2, Apr. 2011, pp. 1-11.

(Continued)

*Primary Examiner* — Maurice L McDowell, Jr.
(74) *Attorney, Agent, or Firm* — Tutunjian & Bitetto, P.C.

(57) ABSTRACT

A noise-aware single-image super-resolution (SI-SR) method and apparatus automatically cancels additive noise while adding detail learned from lower scale of an input image. A recent and efficient in-place cross-scale self-similarity prior is exploited for both learning fine detail examples to complement the interpolation-based upscaled image patches and reducing image noise.

14 Claims, 6 Drawing Sheets

(56) References Cited

OTHER PUBLICATIONS

Freeman et al., "Example-Based Super-Resolution", IEEE Computer Graphics and Applications, vol. 22, No. 2, Mar./Apr. 2002, pp. 56-65.

Glasner et al., "Super-Resolution from a Single Image", IEEE International Conference on Computer Vision, Kyoto, Japan, Sep. 29, 2009, pp. 349-356.

Liu et al., "A Bayesian Approach to Adaptive Video Super Resolution", IEEE Conference on Computer Vision and Pattern Recognition, Providence, Rhode Island, USA, Jun. 20, 2011, pp. 209-216.

Liu et al., "Noise Level Estimation Using Weak Textured Patches of a Single Noisy Image", IEEE International Conference on Image Processing, Orlando, Florida, USA, Sep. 30, 2012, pp. 665-668.

Yang et al., "Fast Image Super-resolution Based on In-place Example Regression", IEEE Conference on Computer Vision and Pattern Recognition, Portland, Oregon, USA, Jun. 23, 2013, pp. 1059-1066.

Yang et al., "Image Super-Resolution via Sparse Representation", IEEE Transactions on Image Processing, vol. 19, No. 11, Nov. 2010, pp. 2861-2873.

Kim et al., "Single-Image Super-Resolution Using Sparse Regression and Natural Image Prior", IEEE Transactions on Pattern Analysis and Machine Intelligence, vol. 32, No. 6, Jan. 2010, pp. 1127-1133.

Salvador et al., "Fast Single-Image Super-Resolution with Filter Selection", IEEE International Conference on Image Processing, Melbourne, Australia, Sep. 15, 2013, pp. 640-644.

Timofte et al., "Anchored Neighborhood Regression for Fast Example-Based Super-Resolution", IEEE International Conference on Computer Vision, Sydney, Australia, Dec. 1, 2013, pp. 1920-1927.

Zontak et al., "Separating Signal from Noise using Patch Recurrence Across Scales", IEEE Conference on Computer Vision and Pattern Recognition, Portland, Oregon, USA, Jun. 23, 2013, pp. 1195-1202.

Fig.4 a) YPSNR b) SSIM

METHOD FOR PERFORMING SUPER-RESOLUTION ON SINGLE IMAGES AND APPARATUS FOR PERFORMING SUPER-RESOLUTION ON SINGLE IMAGES

This application claims the benefit, under 35 U.S.C. § 365 of International Application PCT/EP2015/053111, filed on Feb. 13, 2015, which was published in accordance with PCT Article 21(2) on Aug. 20, 2015 in English, and which claims the benefit of European patent application No. 14305189.4 filed on Feb. 13, 2014 and European patent application No. 14174107.4 filed on Jun. 26, 2014.

FIELD OF THE INVENTION

This invention relates to a method the field of performing super-resolution on single images, and in particular to robust Single-Image Super-Resolution (SI-SR) using cross-scale self-similarity.

BACKGROUND

Single-image super-resolution (SI-SR [1, 2]) has been an important focus of research during the last years, arguably due to the following two reasons: (1) in contrast with classic reconstruction-based super-resolution (RB-SR [3, 4]), the use of more advanced image priors in SI-SR alleviates the requirement of having different captures of the same scene with subpixel shifts; and (2) numerical stability problems that might arise when reconstructing the super-resolved image under inaccurate models are also avoided by using more meaningful image priors.

Even though the above two advantages imply great practical benefits for many applications, noise handling is an often overlooked yet major shortcoming of SI-SR techniques. The use of different captures of the same scene when estimating a super-resolved image in RB-SR naturally introduces an implicit reduction of the noise level and an improvement of the problem condition. However, most SI-SR techniques will produce an increased noise level in the upscaled image.

Cross-scale self-similarity, introduced by Glasner et al. [2], has been a widely utilized prior for SI-SR algorithms. Its main advantage is the adaptivity to the image contents. Whereas this type of prior was originally presented while considering all possible locations within all possible scales as references, posterior results—such as those provided by Freedman et al. [5], where the search range for examples is restricted to a small rectangular window in a single scale, or Yang et al. [6], where conditions are determined for further reducing the search space to a single location (in-place example) when combined with linear regression—have progressively allowed to improve the efficiency of SR approaches without losing accuracy. An often omitted question is the extension of these powerful priors to the case of noisy images. This problem has been recently addressed by Zontak et al. [7] in a denoising scenario.

Thus, various single-image super-resolution algorithms are known that provide good results as long as the input image is noise free. A problem is that these algorithms provide much worse results as soon as the input image is noisy. The usage of in-place optimization with patches from different downscaled versions of noisy images for denoising and performing super-resolution (no HF/LF) is known from [4].

It is noted that the actual goal of upscaling/SR is to preserve, at a higher resolution, the quality that an image has at the original scale. This is relatively easy to achieve if the image is clean, but if it is not, then denoising has to be applied before upscaling in order to avoid amplifying the noise power. In classical reconstruction-based SR with several images, it is known to jointly apply denoising with the upscaling step. For example-based SR (i.e. single image super-resolution, SI-SR), a one-step upscaling and denoising has been disclosed by Yang et al. [6], where in-place self-similarity combined with offline learning is used and where noise-robustness is explicitly demonstrated. However, [6] relies on and is limited to in-place self-similarity.

SUMMARY OF THE INVENTION

A novel noise-aware SI-SR approach is disclosed, adapting the recently introduced in-place cross-scale self-similarity prior to the SR problem. One main idea is to exploit the reduced amount of noise in downscaled versions of the input to jointly denoise and complement with fine detail the upscaled image. The present invention uses jointly denoising and upscaling in example-based SR by exploiting just the cross-scale self-similarity prior.

Advantageously, the proposed solution provides much better results for super-resolution of noisy input images than known super-resolution algorithms.

According to the invention, a noise-aware single-image super-resolution (SI-SR) method and apparatus automatically cancels additive noise while adding detail learned from lower scales. In contrast to known SI-SR techniques, the input image is not necessarily assumed to be a clean source of examples. Instead, a recent and efficient in-place cross-scale self-similarity prior is exploited for both learning fine detail examples to complement the interpolation-based upscaled image patches and reducing image noise.

In one embodiment, a method of the proposed SISR solution has exemplary the following steps:
  (1a) generating an initial upscaled version of the input image (by any type of interpolation) and (1b) determining a noise level σ of the input image,
  (2a) generating several downscaled versions of the input image, and
  (2b) generating for each of them a low-frequency (LF) version,
  (3) determining, for each patch of the initial upscaled version of the input image, a position of at least one best matching patch among the LF versions of the downscaled versions of the input image, wherein noise levels of the downscaled versions of the input image are considered and wherein the noise level of the input image is used to calculate the noise levels of the downscaled versions of the input image, and
  (4) extracting patches from the downscaled images (or their high-frequency HF versions, but not their LF versions) at the determined positions of the best matching patches, and
  (5) reconstructing the upscaled version of the input image using the extracted patches.

In one embodiment, the above process is iterated, wherein the reconstructed upscaled version of the input image of a preceding iteration is used as input for the next iteration. In one embodiment, when iterating, only one best matching patch is determined and used in early iterations, but more than one best matching patch in later iterations (at least in the last iteration, in one embodiment).

In one embodiment, the process is performed iteratively, wherein the reconstructed upscaled version of the input image is used as input for the next iteration. In one embodiment, during iterating, only one best matching patch in early iterations is determined and used, but more than one best matching patch in later iterations (at least in the last iteration).

Concerning the step (2), in one embodiment pyramids of downscaled versions of the input image are generated, as e.g. in [4]. E.g. in one set of downscaled images only the x-axis is scaled (referred to as one pyramid), in another set only the y-axis is scaled (another pyramid), and in a third set both the x- and y-axis are scaled at a constant aspect ratio (yet another pyramid).

Concerning the step (3), in one embodiment, the method of the proposed SISR solution comprises determining for each patch of the initial upscaled version of the input image, at a horizontal scale U and vertical scale V, at least one best matching patch that is within a LF version of the downscaled versions of the input image, at the same relative coordinates as the patch of the initial upscaled version of the input image. Thus, no search on other positions needs to be performed in this embodiment. However, the fact that smaller scales comprise less noise is taken into account. In one embodiment, the so-called similarity cost of a patch $y_{U,V}$ is the argument of the argmin function (cf. eq. (3) below):

$$\|y_{0,0}-y_{U,V}\|_2^2 + 2\rho_{U,V}(\sigma_{0,0}).$$

Here, the first term $\|y_{0,0}-y_{U,V}\|_2^2$ relates to structural similarity and the second term $2\rho_{U,V}(\sigma_{0,0})$ relates to noise level. The second term is important, since it penalizes patches from similar (i.e. nearer) scales. These patches are more probable to contain the required details, but also have more noise. For the calculation of $\sigma$ (according to eq. (2) below), note that $\alpha<1$.

Concerning the steps (3), (4) and (6), in one embodiment, if the process is iterative, a first set of one or more iterations (early iterations) determine and use only one best matching patch of their respective preceding iteration as input, and a subsequent second set of iterations (one or more later iterations) determine and use more than one best matching patch of their respective preceding iteration as input. In one embodiment, only the last iteration out of two or more iterations determines and uses more than one best matching patch of its preceding iteration, while all previous iterations determine and use only one best matching patch of their respective preceding iteration as input.

An apparatus that utilizes the method is disclosed in claim 11.

In one embodiment, the invention relates to a computer readable medium having stored thereon executable instructions that when executed on a computer cause the computer to perform a method as disclosed above.

Novel features of the present invention comprise at least an addition of a noise-dependent term in the patch similarity cost calculation, a way to determine the noise level of a patch through calculation, and a step of generating LF versions of the downscaled images and searching within these LF versions to determine best matching patches.

An advantage of the present invention is that the solution has about the same complexity as regular example-based SR, without adding extra overhead for denoising. By doing both tasks in one step, the computation time can be reduced to roughly half of the time (considering that denoising has about the same complexity as SR upscaling).

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 an overview of the robust SR approach according to the invention.

DETAILED DESCRIPTION OF THE INVENTION

Figure 1:
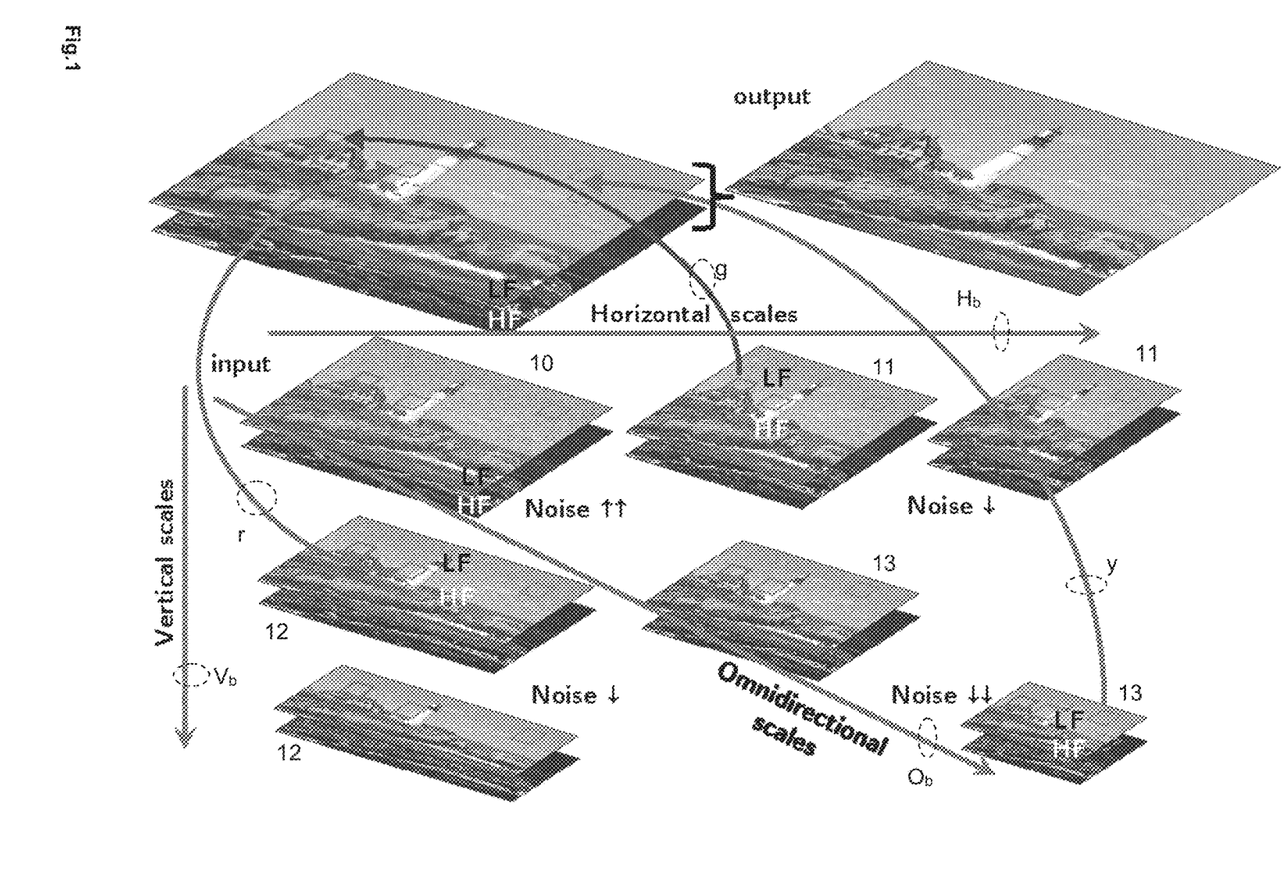

An overview of the disclosed approach, which is described below, is shown in FIG. 1. An input image 10 is scaled horizontally $H_b$, vertically $V_b$ and omnidirectionally $O_b$ (ie. both horizontally and vertically with same ratio), wherein a pyramid of horizontally scaled images 11, a pyramid of vertically scaled images 12 and a pyramid of omnidirectionally scaled images 13 are obtained. A patch from the input image 10 with horizontal structure, vertical structure or omnidirectional structure is reconstructed from the optimal scale in the horizontal (vertical, omnidirectional) multiscale pyramid, thus trading off noise level and structure similarity. The reconstruction strategy allows simultaneously reducing noise in the coarse (C) interpolated band and adding fine (F) detail learned from lower-resolution scales.

Let x be a noiseless high-resolution image and y the noisy downscaled observation, i.e. $y=(x*h_d)\downarrow(s,s)+n$, where $h_d$ is a suitable interpolation filter, $\downarrow(s,s)$ is a downscaling operator producing an image s times smaller than the original one along each spatial axis, and n is white additive noise.

It is well known that natural images often show a decaying spectrum, i.e. $S_x(\Omega)\sim 1/\Omega^2$, where $S_x(\Omega)$ is the power spectral density of the clean image x and $\Omega$ is a norm of the 2D normalized spatial frequency, i.e. $\Omega=\|\Omega\|_a$, with $\Omega=(\Omega_1, \Omega_2)$ for some $0<a\leq 2$. If we now consider the frequency-domain SNR behaviour of the degraded image y, i.e. $SNR_y(\Omega)$, it also decays quadratically with given the flat shape of $S_n(\Omega)$ (white noise).

Interpolation-based SR (e.g. bicubic) generates a coarse estimate of x as $x_c=[y\uparrow(s,s)]*h_u$, such that $S_{x_c}(\Omega)\cong S_y(s\Omega)$ $|0\leq\Omega\leq\Omega_c=\frac{1}{2}s$. The main task of a SI-SR algorithm is to fill in the higher band of the spectrum $\Omega_c\leq\Omega<\frac{1}{2}$), which can be accomplished by exploiting strong statistics in natural images, e.g. cross-scale self-similarity.

Figure 2:
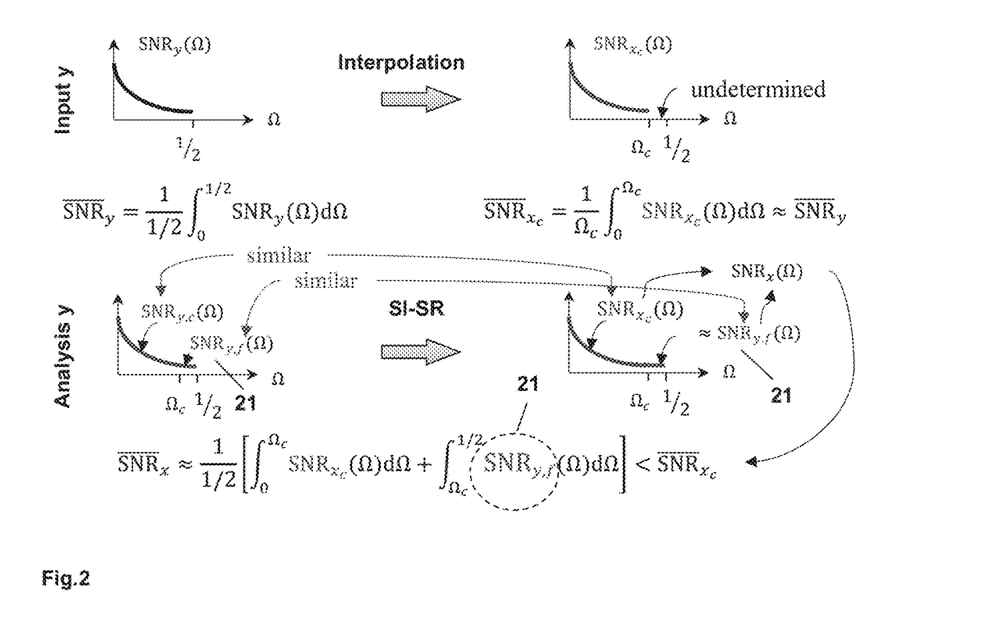
FIG. 2 signal-noise-ratio (SNR) degradation after SI-SR.

FIG. 2 shows SNR degradation after Single-Image SR. Note how the noisiest part of the frequency-domain behaviour of the SNR (the fine detail 21) influences a larger part of the spectrum after applying SR. This extended support results in a higher weight, which in turn decreases the average SNR.

As shown in FIG. 2, the fine-detail band obtained by SI-SR is directly estimated from the fine-detail band of the input image, which is also the noisiest due to the quadratically decreasing behavior of the frequency-domain SNR. Therefore, the noisiest part of the spectrum receives a higher weight (than in interpolation-based upscaling), resulting in a degraded average SNR. One advantage of the present invention is that it estimates the extended spectrum by learning from examples with enhanced SNR, aiming at the minimization of this degradation.

In-place structure similarity is explained as follows. Let $y_{U,V}$ denote an image obtained by downscaling by $s_U=\alpha^U$ and $s_V=\alpha^V$ (where $\alpha<1$ is an analysis downscaling factor) along each major axis, i.e. $y_{U,V}=(y*h_{U,V})\downarrow(s_U,s_V)$. Let $\psi_{0,0} \in y_{0,0} \equiv y$ be a small patch of p*p pixels (of image data or other features) with its centre located in some normalized coordinates (i.e. coordinates such that (0,0) and (1,1) refer to the top left and bottom right corners of the image, respectively). It is very likely to find a patch $\psi_{U,V} \in y_{U,V}$ at exactly the same normalized coordinates and such that $\psi_{U,V} \approx \psi_{0,0}$ for some scale indices $U,V \geq 0$. Note that subscripts refer to scales; the optimal one can then be determined as $$\hat{U},\hat{V}=\operatorname{argmin}_{U,V}\|\psi_{0,0}-\psi_{U,V}\| \quad (1)$$

which will most likely result in scales close to the original (indices U=0, V=0) when y is not corrupted by noise, since structure similarity is naturally stronger when images (or other features) are of similar scales.

Next, noisy in-place self-similarity is explained as follows. Even if the input image contains a high level of noise, a downscaled version can be close to noiseless. Indeed, the image noise level σ, which exponentially decays when downscaling, can be modeled as $$\sigma_{U,V}=\sigma_{0,0}\alpha^{U/2}\alpha^{V/2} \quad (2)$$

where $\sigma_{0,0}$ is the noise level of the original image. On the other hand, in-place structure similarity drops as scales become further apart. Thus, when looking for similar reference patches, we must trade-off structure similarity and noise level. Three examples of this situation are illustrated in FIG. 1, including patches with strong vertical (e.g. the roof) and horizontal (e.g. the tower) gradients and also an unstructured patch (e.g. the sky). The optimal scale in the noisy case can be determined as $$\hat{U},\hat{V}=\operatorname{argmin}_{U,V}\{\|\psi_{0,0}-\psi_{U,V}\|_2^2+2\rho_{U,V}(\sigma_{0,0})\} \quad (3)$$

where $\rho_{U,V}(\sigma)=p^2\sigma^2\alpha^{U+V}$ is the approximate noise correlation between the p*p patch in the original scale and the in-place one in a scale with indices U,V. Below it is shows how to adapt this noise-aware prior to the problem of SI-SR.

The proposed approach extends existing SI-SR algorithms by incorporating the in-place cross-scale self-similarity prior, which results in a joint denoising and high-quality upscaling of sharp, yet noisy input images. The method, summarized in Tab.1, can be divided in four steps: (1) interpolation-based coarse upscaling; (2) coarse/fine analysis with multi-scale pyramids; (3) learning of coarse/fine in-place examples from the most suitable scales (noise vs. structure trade-off); and (4) reconstruction by accumulation of the denoised learned contributions.

Details of the Interpolation step are as follows.

In first place, y is upscaled by a factor s using an interpolation-based approach. Despite the choice of an optimal interpolation filter $h_s$ is a relevant topic [6,9], we exemplary just use bicubic interpolation here. The resulting $x_c$ is a coarse (and noisy) estimate of the desired image x. Besides, the noise level σ of the input image y is determined by using any method, e.g. the method by Liu et al. [8].

TABLE 1

Pseudo-code for robust In-Place super-resolution
Algorithm 1: ROBUST IN-PLACE SR Data: Noisy image y and upscaling factor s
Result: Upscaled image $\hat{x}$
σ ← NoiseLevel(y), from [8]
$x_c$ ← [y↑(s,s)]*$h_s$ (coarse), $\hat{x}$ ← 0, a ← 0
for each analysis scale U, V do
  | $y_{U,V}$ ← (y*$h_{U,V}$)↓($s_U$, $s_V$) (denoised)
  | $c_{U,V}$ ← $y_{U,V}$*$h_s$ (denoised coarse)
for each patch $\mathcal{X}_c \in x_c$ with $\mathcal{P}_x$ = supp($\mathcal{X}_c$) do
  | ∈ ← $\min_{U,V}\{\|\mathcal{X}_c - c_{U,V}\|_2^2 + 2\rho_{U,V}(\sigma)\}$
  | for U,V | $\|\mathcal{X}_c - c_{U,V}\|_2^2 + 2\rho_{U,V}(\sigma) < \kappa \cdot \in$ do
  |   | $\hat{x}(\mathcal{P}_x) \leftarrow \hat{x}(\mathcal{P}_x) + y_{U,V}$,  $a(\mathcal{P}_x) \leftarrow a(\mathcal{P}_x)+1$
  |_
return $\hat{x}$ ← $\hat{x}$/a (element-wise division)

Details of the Analysis step are as follows.

A total number of $3N_s-2$ downscaled versions $y_{U,V}$ of the input image are generated (similarly to the example shown in FIG. 1), where Ns is the number of scales along one of the three pyramids. The possible combinations of U,V are restricted to the scales $\{0,l\} \cup \{l,0\} \cup \{l,l\}$ with $l=\{0,\ldots,N_S\}$, i.e. horizontal and vertical edge-preserving pyramids and an isotropic pyramid, respectively.

Also, a coarse version of each scale is computed by applying $h_S$, the same filter used for upscaling. Whereas each coarse $c_{U,V}$ provides estimates of (almost) noiseless versions of the coarse patches in $x_C$, the difference between the scaled image $y_{U,V}$ and its corresponding $c_{U,V}$ is fine detail information, which is missing in $x_C$. As a result of this analysis, cross-scale self-similarity (and denoising) can be performed on the coarser scales ($x_C$ and $\{c_{U,V}\}$) and joint denoising and super-resolution can be obtained from the richer information in $\{y_{U,V}\}$.

Details of the Learning step are as follows.

Figure 3:
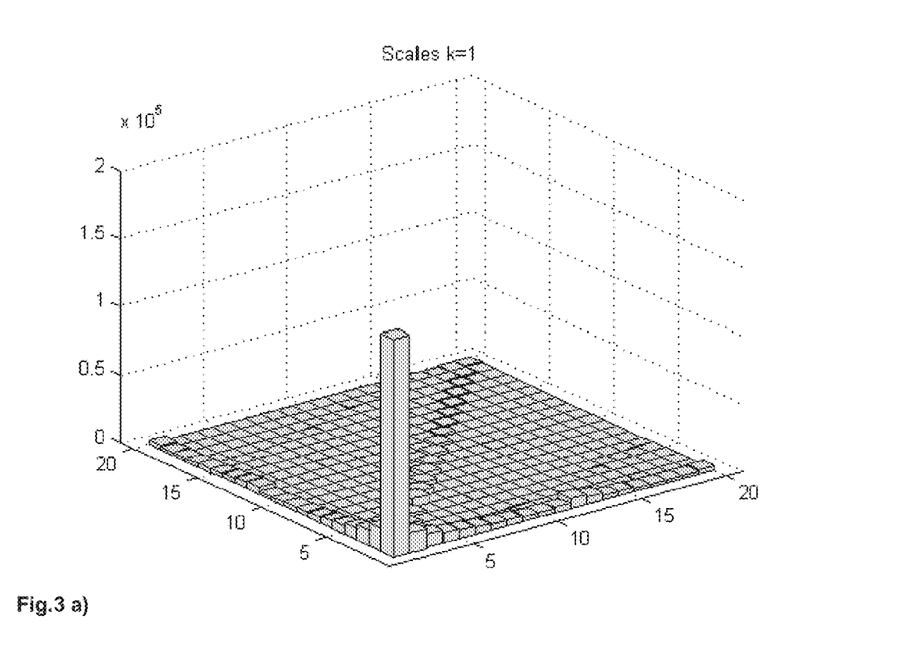
FIG. 3 Distribution of the scale U; V of the noise-aware most similar patches.

The known noise level and the analysis pyramids are used to determine the patch in a lower scale that best describes the structure of each coarse patch $x_C \in x_C$. The scale of the (coarse) in-place matching patch is determined following the robust in-place self-similarity strategy in Eq. (3), with $x_C$ and $c_{U,V}$ ($\in c_{U,V}$) replacing $\psi_{0,0}$ and $\psi_{U,V}$, respectively. The best matching patch and the next most similar ones (in scales showing a similarity cost up to k times that of the best one) must be taken as possible realizations of the (coarse) latent noiseless patch, considering the variance on the noise process. By doing so, true optimal matches are included with higher probability than by just taking the best match. FIG. 3 shows the distribution of the most similar scales for all patches of an image corrupted with different noise levels. Note the selection of coarser scales with progressively noisier input. Since $\{y_{U,V}\}$ can be interpreted as enriched (fine detail information) versions of the chosen $\{c_{U,V}\}$, super-resolution can be obtained from the patches of the former.

Details of the Reconstruction step are as follows.

The final reconstruction stage is a simple averaging of the contributions of the example patches learned in the previous stage. More sophisticated filtering or regression techniques might provide additional improvements in terms of the noise reduction vs. feature preservation trade-off.

Further Implementation details are provided as follows. It is advisable to reach the desired magnification factor s iteratively (in smaller steps); e.g. an upscaling with s=2 can be implemented as an initial upscaling with $s_1$=4/3 and a second one with $s_2$=3/2. The wider available bandwidth for matching with smaller magnification factors results in a better selection of examples during learning. The first iterations assume a noiseless scenario to keep as much information from the underlying noiseless image as possible throughout the upscaling stages. Thus, during these first iterations only the fine detail of the (single) best match is used to complement the interpolated coarse estimate. The last iteration uses the complete algorithm in Tab.1, where the coarse band is both denoised and complemented with fine detail.

In one embodiment, fully overlapping patches (sliding window) are used, with a size as defined by the noise level (p={3,5,7} for σ<{10,20,∞}, respectively). In one embodiment, the described method is applied only onto the luminance channel. This is advantageously less computationally complex, since the chrominance channels can be denoised using the same cross-scale self-similarity prior and be simply interpolated to the desired scale. $N_s$=20 analysis scales are set per pyramid, with an analysis downscaling factor α=0,9.

Figure 4:
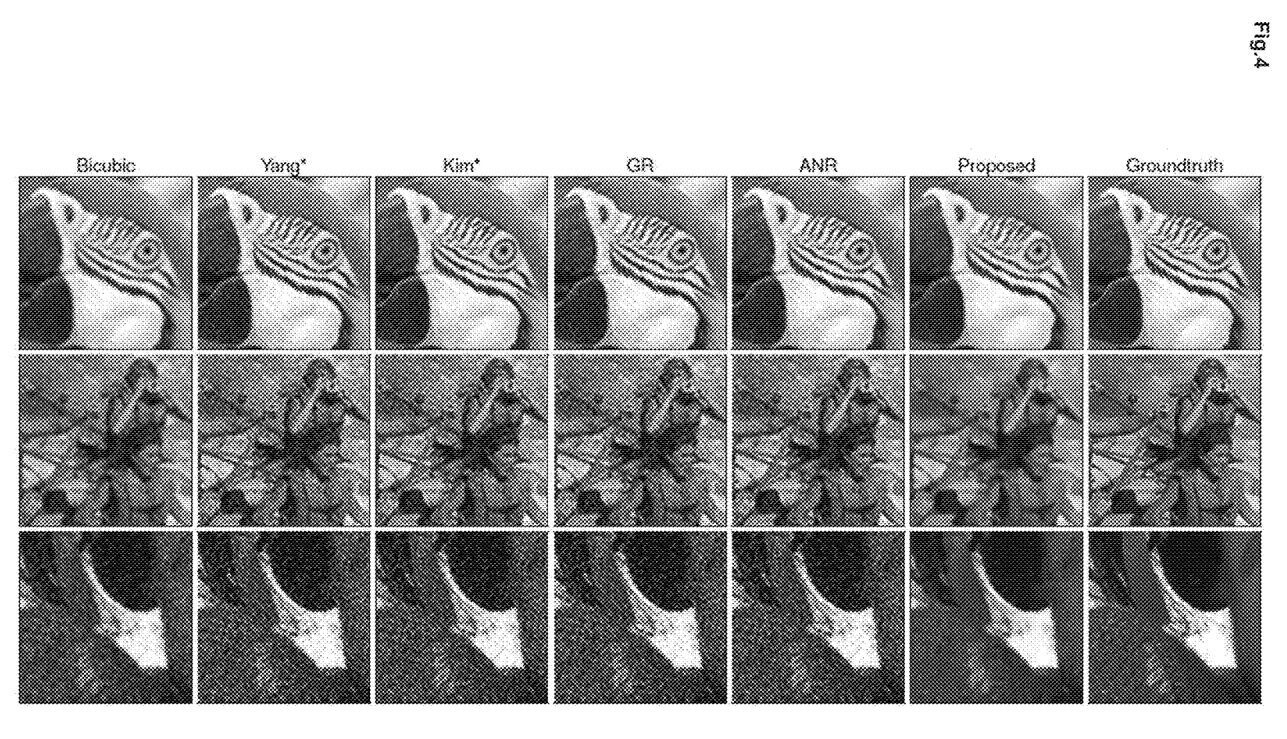
FIG. 4 details of x2 upscaling of three images corrupted with additive white Gaussian noise with $\sigma=5, 10, 15$ respectively.

The proposed approach was validated by means of an objective evaluation on 24 images of the Kodak dataset and a subjective validation. These images, which are used as ground truth, are downscaled by a factor of s=2 using bicubic interpolation and corrupted with 12 different levels (α=0, 5, . . . , 55) of white Gaussian noise to build the input. A number of state-of-the-art methods have been selected, including two sparse-dictionary approaches by Timofte et al. [10] (Global Regression, GR, and the adaptive Anchored Neighborhood Regression, ANR), a regression-based approach with high-quality post-processing based on the natural image prior by Kim et al. [11] and a well-known sparse dictionary approach by Yang et al. [12], which is also post-processed (with iterative back-projection). In GR, ANR and the method according to the invention, post-processing is not applied, even though it can greatly improve the SR performance for low noise levels. FIG. 4 shows, from top to bottom, details of x2 upscaling of three images corrupted with additive white Gaussian noise with σ=5, 10, 15, respectively. The right-most column shows the ground truth, while the $2^{nd}$ column from the right show results obtained from a method or apparatus according to the present invention. As can be seen, the proposed method when compared to the other approaches shows improved robustness. Note that Kim et al.'s and Yang et al.'s methods include post-processing, which is only useful for very low noise levels. Visual inspection of the sample results in FIG. 4 subjectively validate the proposed approach. We can observe how the proposed prior is competent for SR with noticeable input noise levels (note the sharp edges with a relatively high noise level σ=15, see $3^{rd}$ row), whereas all other tested methods, including the baseline bicubic interpolation, offer severely impaired performance. One possible downside of the proposed method is the attenuation of texture details. However, this is also common to non-upscaling denoising algorithms. Also note how noise is amplified by the other SR approaches compared to that of bicubic interpolation (expected according to the above explanation), while noise is appropriately canceled by the present invention.

Figure 5:
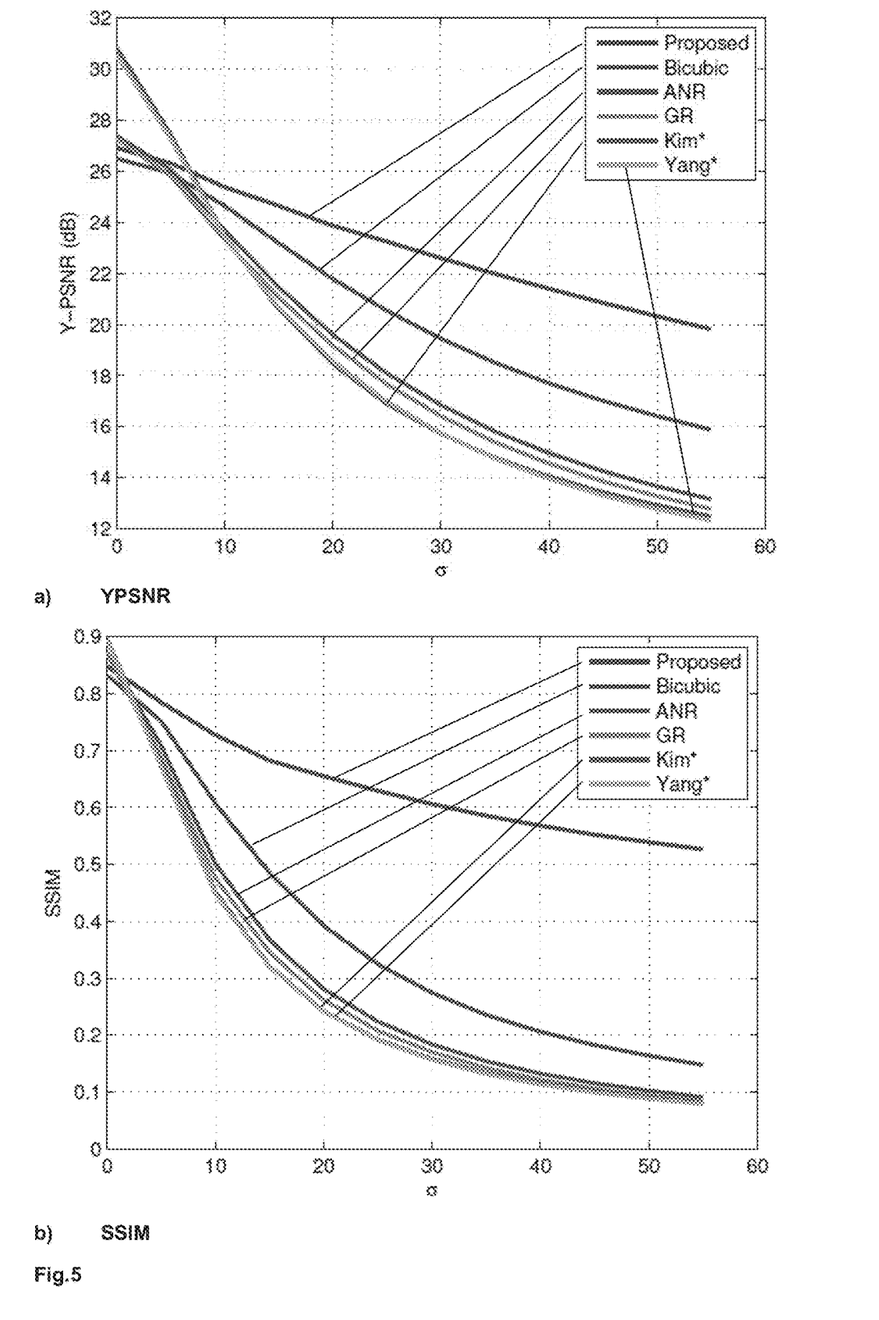
FIG. 5 Y-PSNR (dB) and SSIM for different noise levels.

The most relevant results of our objective evaluation can be summarized as in FIG. 5, which shows the luminance channel (Y-PSNR, in dB) and the Structural Similarity (SSIM) for different noise levels σ=0, 5, . . . , 55. Both the PSNR measured on Y-PSNR and SSIM show a much improved performance of our proposed SR algorithm when the noise level is high. In the noiseless case, the performance of our method is close to that of the state-of-the-art ANR and higher than that of the baseline bicubic interpolation (the methods by Yang et al. and Kim et al. use post-processing and are not suitable for comparison to that respect). As soon as noise corrupts the input images, our proposed method clearly provides the best performance (especially in terms of SSIM). We also note the harmful effect of post-processing with noise, which makes the performance of the post-processed approaches quickly drop. This validates the subjective observation about the noise amplification by SR approaches in comparison to interpolation-based methods. One advantage of the invention is a reduced processing time required when processed on a computer. On an Intel Xeon W3690, the proposed method takes an average 2.1 seconds/frame (s/f) to jointly denoise and super-resolve to 720×576 pixels (output size). GR and ANR take average times of 2.1 s/f and 3.0 s/f, respectively, and Yang et al.'s method 601.3 s/f. Kim et al.'s method largely varies from 15 to 170 s/f with the scene complexity; execution time is higher with noise.

Figure 6:
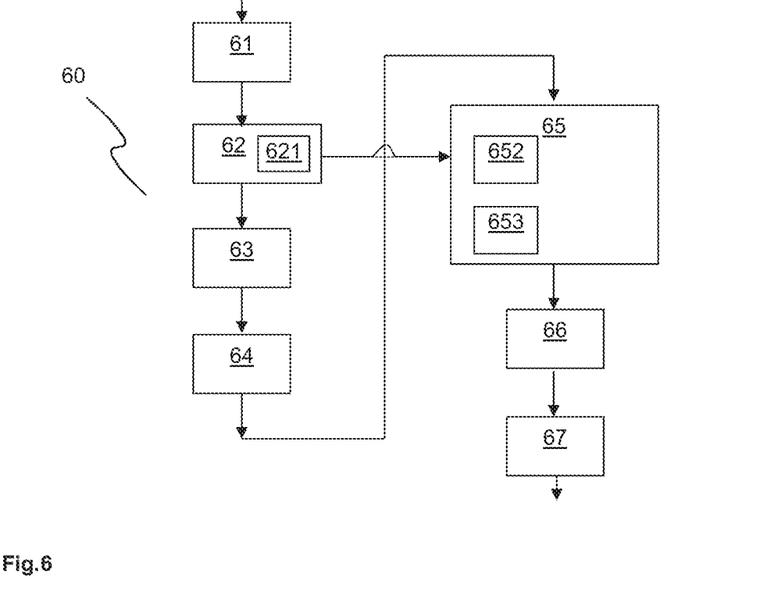
FIG. 6 a flow-chart of the method according to the invention.

FIG. 6 shows, in one embodiment, a flow-chart of a method 60 for performing super-resolution on a single input image, comprising steps of generating 61 an initial upscaled version of the input image; determining 62 a noise level $σ_{0,0}$ of the input image; generating 63 at least two downscaled versions of the input image; generating 64 for each of the downscaled versions of the input image a low-frequency version; determining 65, for each patch of the initial upscaled version of the input image, a position of at least one best matching patch among the low-frequency versions of the downscaled versions of the input image, wherein noise levels of the downscaled versions of the input image are considered and wherein the noise level $σ_{0,0}$ of the input image is used to calculate the noise levels of the downscaled versions of the input image; extracting 66 patches from the downscaled images at the determined positions of the best matching patches; and reconstructing 67 the upscaled version of the input image using the extracted patches.

In one embodiment, an additional step comprises calculating, from the noise level $σ_{0,0}$ of the input image, noise levels $σ_{U,V}$ of the downscaled images at scales U,V according to eq. (2), with 0.85<α<0.95 (preferably α=0.9).

In one embodiment, the method further comprises, e.g. in the determining step 65, determining for each current patch of the initial upscaled version of the input image at least one best matching patch that is within a low-frequency version of said downscaled versions of the input image, at a horizontal scale U and vertical scale V, wherein said at least one best matching patch is at the same relative coordinates as a current patch of the initial upscaled version of the input image, and wherein a similarity cost of a patch $y_{U,V}$ is calculated 652 for determining 653 which patch is matching best according to $\|y_{0,0}-y_{U,V}\|_2^2+2\rho_{U,V}(σ_{0,0})$, wherein the first term relates to a structural similarity between patches and the second term relates to a noise level calculated according to eq. (2) for a horizontal scale U and vertical scale V.

Figure 7:
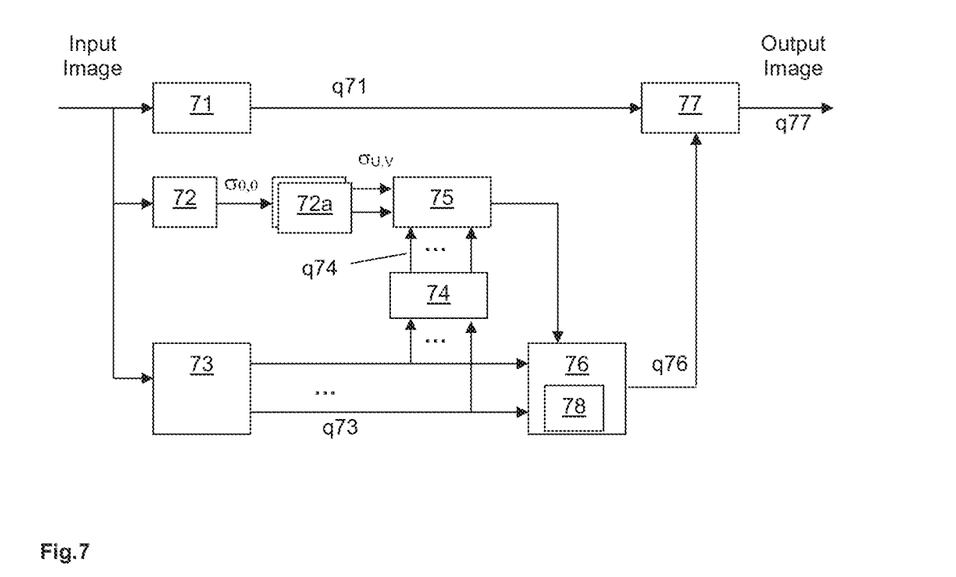
FIG. 7 a block diagram of an apparatus according to the invention.

FIG. 7 shows, in one embodiment, the structure of an apparatus 70 for performing super-resolution on a single input image according to the invention. The apparatus comprises an upscaling module 71 for generating 61 an initial upscaled version q71 of the input image; a noise level determining module 72 for determining 62 a noise level σ of the input image; a downscaling module 73 for generating 63 at least two downscaled versions q73 of the input image; a low-frequency filtering module 74 for generating 64 for each of the downscaled versions q73 of the input image a low-frequency version q74; a patch position determining module 75 for determining 65, for each patch of the initial upscaled version q71 of the input image, a position q75 of at least one best matching patch among the low-frequency versions q74 of the downscaled versions of the input image; a patch extracting module 76 for extracting 66 patches q76 from the downscaled images at the determined positions of the best matching patches; and an image reconstruction module 77 for reconstructing 67 the upscaled version q77 of the input image using the extracted patches.

In one embodiment, the apparatus further comprises at least one noise level determining module 72a for determining noise levels of the downscaled versions of the input image, wherein the noise level of the input image is used to calculate the noise levels of the downscaled versions of the input image.

In one embodiment, the apparatus further comprises a matching module 78 for determining for each current patch of the initial upscaled version of the input image, at a horizontal scale U and vertical scale V, at least one best matching patch that is within a low-frequency version of said downscaled versions of the input image, wherein said at least one best matching patch is at the same relative coordinates as a current patch of the initial upscaled version of the input image, and wherein a similarity cost of a patch $y_{U,V}$ is calculated for determining which patch is matching best according to $\|y_{0,0}-y_{U,V}\|_2^2+2\rho_{U,V}(\sigma_{0,0})$, wherein the first term relates to a structural similarity between patches and the second term relates to a noise level.

In one embodiment, the apparatus further comprises one or more modules 72a, each for calculating a noise level for at least one downscaled version of the input image, at a horizontal scale U and vertical scale V, according to $\sigma_{U,V}=\sigma_{0,0}\alpha^{U/2}\alpha^{V/2}$.

As being clear from the above, the present invention provides a fast robust single-image super-resolution algorithm exploiting the in-place cross-scale self-similarity prior. By using this prior, the algorithm can automatically select the best possible examples for both denoising and complementing with fine detail a coarse version of the desired high-resolution image obtained by interpolation-based upscaling. The experimental results reflect a favorable comparison of our method to current super-resolution approaches in presence of noise. Given that natural images are often captured with a noticeable amount of noise (especially in video, with limited exposure), it is advisable to adopt robust upscaling schemes to ensure the fidelity of the upscaled images with respect to the original scene.

The noise-aware single-image super-resolution (SI-SR) method and apparatus according to the invention automatically cancels additive noise while adding detail learnt from lower scales. In contrast to common SI-SR techniques, the input image is not necessarily assumed to be a clean source of examples. Instead, a recent and efficient in-place cross-scale self-similarity prior is exploited for both learning fine detail examples to complement the interpolation-based upscaled image patches and reducing image noise. Experimental results show a promising performance, despite of the relatively simple algorithm. Both objective and subjective evaluations show large quality improvements when upscaling images immersed in noise.

It will be understood that the present invention has been described purely by way of example, and modifications of detail can be made without departing from the scope of the invention. Each feature disclosed in the description and (where appropriate) the claims and drawings may be provided independently or in any appropriate combination.

Features and modules may, where appropriate be implemented in hardware, software, or a combination of the two. Connections may, where applicable, be implemented as wired or wireless or optical or other, not necessarily direct or dedicated, connections. Reference numerals appearing in the claims are by way of illustration only and shall have no limiting effect on the scope of the claims.

CITED REFERENCES

[1] W. T. Freeman, T. R. Jones, and E. C. Pasztor, "Example-Based Super-Resolution," IEEE Comp. Graph. Appl., vol. 22, no. 2, pp. 56-65, 2002.
[2] D. Glasner, S. Bagon, and M. Irani, "Super-resolution from a single image," in Proc. IEEE Int. Conf. on Computer Vision, 2009, pp. 349-356.
[3] S. Farsiu, M. D. Robinson, M. Elad, and P. Milanfar, "Fast and robust multiframe super resolution," IEEE Trans. on Image Processing, vol. 13, no. 10, pp. 1327-1344, 2004.
[4] C. Liu and D. Sun, "A Bayesian Approach to Adaptive Video Super Resolution," in Proc. IEEE Conf. on Computer Vision and Pattern Recognition, 2011, pp. 209-216.
[5] G. Freedman and R. Fattal, "Image and video upscaling from local self-examples," ACM Trans. on Graphics, vol. 30, no. 2, pp. 12:1-12:11, 2011.
[6] J. Yang, Z. Lin, and S. Cohen, "Fast image superresolution based on in-place example regression," in Proc. IEEE Conf. on Computer Vision and Pattern Recognition, 2013, pp. 1059-1066.
[7] M. Zontak, I. Mosseri, and M. Irani, "Separating signal from noise using patch recurrence across scales," in Proc. IEEE Conf. on Computer Vision and Pattern Recognition, 2013, pp. 1195-1202.
[8] X. Liu, M. Tanaka, and M. Okutomi, "Noise level estimation using weak textured patches of a single noisy image," in Proc. IEEE Int. Conf. on Image Processing, 2012, pp. 665-668.
[9] J. Salvador, E. P'erez-Pellitero, and A. Kochale, "Fast single-image super-resolution with filter selection," in Proc. IEEE Int. Conf. on Image Processing, 2013, pp. 640-644.
[10] R. Timofte, V. De Smet, and L. Van Gool, "Anchored Neighborhood Regression for Fast Example-Based Super-Resolution," in Proc. IEEE Int. Conf. on Computer Vision, 2013, pp. 1920-1927.
[11] K. I. Kim and Y. Kwon, "Single-Image Super-Resolution Using Sparse Regression and Natural Image Prior," IEEE Trans. on Pattern Analysis and Machine Intelligence, vol. 32, no. 6, pp. 1127-1133, 2010.
[12] J. Yang, J. Wright, T. S. Huang, and Y. Ma, "Image super-resolution via sparse representation," IEEE Trans. on Image Processing, vol. 19, no. 11, pp. 2861-2873, 2010.

The invention claimed is:

1. A method for performing super-resolution on a single input image, comprising:
generating an initial upscaled version of the input image;
determining a noise level of the input image;
generating at least two downscaled versions of the input image;
generating for each of the downscaled versions of the input image a low-frequency version;
determining, for each patch of the initial upscaled version of the input image, a position of at least one best matching patch among the low-frequency versions of the downscaled versions of the input image, wherein noise levels of the downscaled versions of the input image are considered and wherein the noise level of the input image is used to calculate the noise levels of the downscaled versions of the input image;

extracting patches from the downscaled images at the determined positions of the best matching patches; and reconstructing the upscaled version of the input image using the extracted patches.

2. The method according to claim 1, wherein the initial upscaled version of the input image is generated by interpolation.

3. The method according to claim 1, wherein said extracting further comprises extracting the patches from the high-frequency versions of the downscaled images.

4. The method according to claim 1, further comprising generating at least one pyramid of images, said pyramid of images being a set of downscaled versions of the input image at different scales.

5. The method according to claim 4, wherein three pyramids of images are generated, wherein in a first pyramid of images only the x-axis is scaled, and in a second pyramid of images only the y-axis is scaled, and in a third pyramid of images both the x- and y-axis are scaled at a constant aspect ratio.

6. The method according to claim 1, wherein the above process is iteratively repeated, wherein a reconstructed upscaled version of the input image resulting from an iteration is used as input for a next iteration.

7. The method according to claim 6, wherein, in a first set of one or more iterations, one best matching patch of a preceding iteration is determined and used as input for a subsequent iteration, and wherein, in a subsequent second set of one or more iterations, more than one best matching patch of a preceding iteration is determined and used as input for a subsequent iteration.

8. The method according to claim 6, wherein, in a first set of one or more iterations, one best matching patch of a preceding iteration is determined and used as input for a subsequent iteration, and wherein, in a single final iteration, more than one best matching patch of the preceding iteration is determined and used as input for the final iteration.

9. The method according to claim 1, further comprising determining for each current patch of the initial upscaled version of the input image at least one best matching patch that is within a low-frequency version of said downscaled versions of the input image, at a horizontal scale U and vertical scale V, wherein said at least one best matching patch is at the same relative coordinates as a current patch of the initial upscaled version of the input image, and wherein a similarity cost of a patch is calculated for determining which patch is matching best according to $$\|y_{0,0} - y_{U,V}\|_2^2 + 2\rho_{U,V}(\sigma_{0,0})$$

wherein the first term $\|y_{0,0} - y_{U,V}\|_2^2$ relates to a structural similarity between patches and the second term $2\rho_{U,V}(\sigma_{0,0})$ relates to a noise level of the patch at the horizontal scale U and vertical scale V.

10. The method according to claim 9, wherein the second term $2\rho_{U,V}(\sigma_{0,0})$ is an approximate noise correlation between the patch in the original scale and the in-place patch at a scale U,V according to $$\rho_{U,V}(\sigma_{0,0}) = p^2 \sigma^2 \alpha^{U+V}$$

wherein $\square$ relates to a noise level of the patch at the horizontal scale U and vertical scale V according to $$\sigma = \sigma_{0,0} \alpha^{U/2} \alpha^{V/2} = \sigma_{U,V}$$

and wherein $0.85 \leq \square\square \leq 0.95$ is an analysis downscaling factor.

11. A non transitory computer readable medium having recorded thereon computer-executable program instructions that when executed on a computer, cause the computer to execute a method of claim 1.

12. An apparatus for performing super-resolution on a single input image, comprising at least one processor configured to implement:

an upscaling module for generating an initial upscaled version of the input image;

a noise level determining module for determining a noise level of the input image;

a downscaling module for generating at least two downscaled versions of the input image;

a low-frequency filtering module for generating for each of the downscaled versions of the input image a low-frequency version;

at least one noise level determining module for determining noise levels of the downscaled versions of the input image, wherein the noise level of the input image is used to calculate the noise levels of the downscaled versions of the input image;

a patch position determining module for determining, for each patch of the initial upscaled version of the input image, a position of at least one best matching patch among the low-frequency versions of the downscaled versions of the input image, wherein the noise levels of the downscaled versions of the input image are considered;

a patch extracting module for extracting patches from the downscaled images at the determined positions of the best matching patches; and an image reconstruction module for reconstructing the upscaled version of the input image using the extracted patches.

13. The apparatus according to claim 12, further comprising a matching module for determining for each current patch of the initial upscaled version of the input image, at relative coordinates U,V, at least one best matching patch that is within a low-frequency version of said downscaled versions of the input image, wherein said at least one best matching patch is at the same relative coordinates as a current patch of the initial upscaled version of the input image, and wherein a similarity cost of a patch yU,V is calculated for determining which patch is matching best according to $$\|y_{0,0} - y_{U,V}\|_2^2 + 2\rho_{U,V}(\sigma_{0,0})$$

wherein the first term $\|y_{0,0} - y_{U,V}\|_2^2$ relates to a structural similarity between patches and the second term $2\rho_{U,V}(\sigma_{0,0})$ relates to a noise level of the patch at the horizontal scale U and vertical scale V.

14. The apparatus according to claim 13, wherein the second term $2\rho_{U,V}(\sigma_{0,0})$ is an approximate noise correlation between the patch in the original scale and the in-place patch at a scale U,V according to $$\rho_{U,V}(\sigma_{0,0}) = p^2 \sigma^2 \alpha^{U+V}$$

wherein $\square$ relates to a noise level of the patch at the horizontal scale U and vertical scale V according to $$\sigma = \sigma_{0,0} \alpha^{U/2} \alpha^{V/2} = \sigma_{U,V}$$

and wherein $0.85 \leq \square\square \leq 0.95$ is an analysis downscaling factor.

* * * * *